(12) United States Patent
Mitchell et al.

(10) Patent No.: US 6,374,368 B1
(45) Date of Patent: Apr. 16, 2002

(54) WEAKEST PRECONDITION ANALYSIS

(75) Inventors: Charles L. Mitchell, Woodinville; Mark L. Hall, Richmond, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/316,684

(22) Filed: May 21, 1999

(51) Int. Cl.$^7$ .............................. G06F 11/26; G06F 9/45
(52) U.S. Cl. ................................. 714/38; 717/4; 717/9
(58) Field of Search ............................. 714/38; 717/4, 717/7, 8, 9

(56) References Cited

U.S. PATENT DOCUMENTS

| 5,822,588 A | 10/1998 | Sterling et al. ............. 395/704 |
| 5,987,252 A | * 11/1999 | Leino et al. ................... 717/4 |
| 6,029,002 A | * 2/2000 | Afifi et al. ...................... 717/7 |

FOREIGN PATENT DOCUMENTS

| EP | 0685792 | 5/1995 | ........... G06F/11/00 |

OTHER PUBLICATIONS

Cimitile et al., "Identifying Reusabel Functions Using Specification Driven Program Slicing: A Case Study", 1995, IEEE, pp. 124–133.*

International Search Report—PCT/US 00/14051, Authorized Officer—G. Corremans, 6 Pages, (Sep. 25, 2000).

Cohen, E., *Programming in the 1990s. An Introduction to the Calculation of Programs*, Springer–Verlag, New York, NY (ISBN 0–387–97382–6), (1990).

Dijkstra, E.W., *A Discipline of Programming*, Prentice–Hall, Englewood Cliffs, NJ, (1976).

Hart, J.M., "Experience with Logical Code Analysis in Software Maintenance", *Software, Practice & Experience*, vol. 25 (11), 1243–1262, (Nov. 1995).

* cited by examiner

*Primary Examiner*—Scott T. Baderman
(74) *Attorney, Agent, or Firm*—Woodcok Washburn LLP

(57) ABSTRACT

Improved weakest condition analysis. In one embodiment, a computer-implemented method including first identifying a set of candidates of a computer program that are potentially defective, via a predetermined data flow analysis. In one embodiment, the predetermined data flow analysis may be a static single assignment analysis, or a partial redundancy analysis. Next, each of these candidates is examine via a weakest precondition analysis to determine whether the candidate actually is defective. The end result is a faster analysis, because the weakest precondition analysis is only performed on those candidates that are deemed potentially defective by the initial predetermined data flow analysis performed.

20 Claims, 3 Drawing Sheets

WEAKEST PRECONDITION ANALYSIS

FIELD OF THE INVENTION

This invention relates generally to analysis of computer programs for defects, and more particularly an improved weakest precondition analysis of computer programs for such defects.

BACKGROUND OF THE INVENTION

Computer programs have become increasingly complex. A modem-day application program, such as a word processing program, developed for an operating system having a graphical user interface, such as a version of Microsoft Windows, can take many years to develop, with the joint efforts of a team of programmers. As a result, computer program analysis to identify defects in a program before it is released to the general public has become increasingly more important. Sophisticated analysis techniques have become available, to allow programmers to identify defects in their programs that may hinder the performance of the programs, or may even cause the programs to crash, reducing their reliability.

One such computer program analysis technique is known as weakest precondition analysis. This is a type of program analysis that precisely tracks the algebraic properties of program variables (typically expressed as functions of other program variables) both before and after every statement in the program being analyzed. It is much more powerful than other program analysis techniques which keep track of only very simple properties of program variables (e.g. whether the variable contains a constant value).

A disadvantage with weakest precondition analysis, however, is that it generally requires a large amount of computer memory to analyze large programs, and thus may also require long periods of time to conduct the analysis. This reduces its usefulness for programmers, to the extent that they may not use weakest precondition analysis because of its time and memory constraints. For these and other reasons, there is a need for the present invention.

SUMMARY OF THE INVENTION

The invention provides for a considerable reduction in the time and memory required to analyze computer programs using weakest precondition analysis of computer programs. In one embodiment, a computer-implemented method includes first identifying a set of candidates of a computer program that are potentially defective, via a predetermined data flow analysis. As used herein, the term data flow analysis is coextensive with the terms program analysis and program structure analysis, such that either can be substituted for the term data flow analysis. Next, each of these candidates is examined via a weakest precondition analysis to determine whether the candidate actually is defective.

In this manner, embodiments of the invention provide for improved weakest precondition analysis. The weakest precondition analysis is not conducted over the entire computer program, but rather as to only those candidates within the computer program that have already been determined to be potentially defective. Desirably, the predetermined data flow analysis to determine such potentially defective candidates is a much quicker analysis than weakest precondition analysis. Thus, the initial identification of a set of candidates that are potentially defective means that the weakest precondition analysis will only be run as to those candidates that may be defective—and not, in other words, as to those candidates that are for certain not defective (as determined by the predetermined data flow analysis). This results in an analysis of the computer program that is relatively fast, but still utilizes weakest precondition analysis.

The invention includes systems, methods, computers, and computer-readable media of varying scope. Besides the embodiments, advantages and aspects of the invention described here, the invention also includes other embodiments, advantages and aspects, as will become apparent by reading and studying the drawings and the following description.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments arc described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Hardware and Operating Environment

Figure 1:
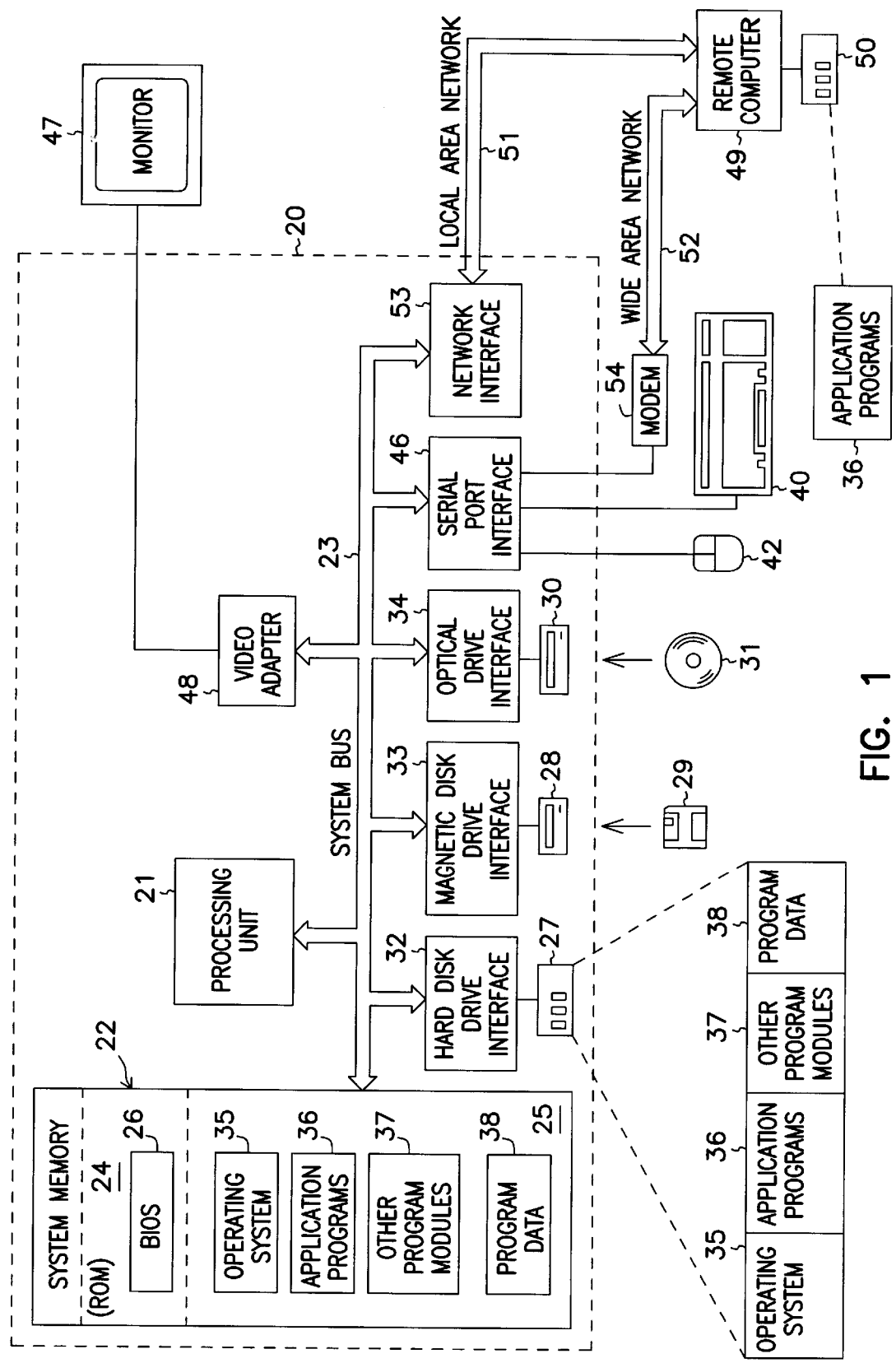
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a bard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB).

A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown arc exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

Method

In this section of the detailed description, a computer-implemented method according to an embodiment of the invention is described. The method may be the evaluate method as described in the previous section of the detailed description, in one embodiment. The description is provided in reference to FIG. 2. The method is desirably realized at least in part as one or more programs running on a computer—that is, as a program executed from a computer-readable medium such as a memory by a processor of a computer. The programs are desirably storable on a computer-readable medium such as a floppy disk or a CD-ROM, for distribution and installation and execution on another (suitably equipped) computer.

Figure 2:
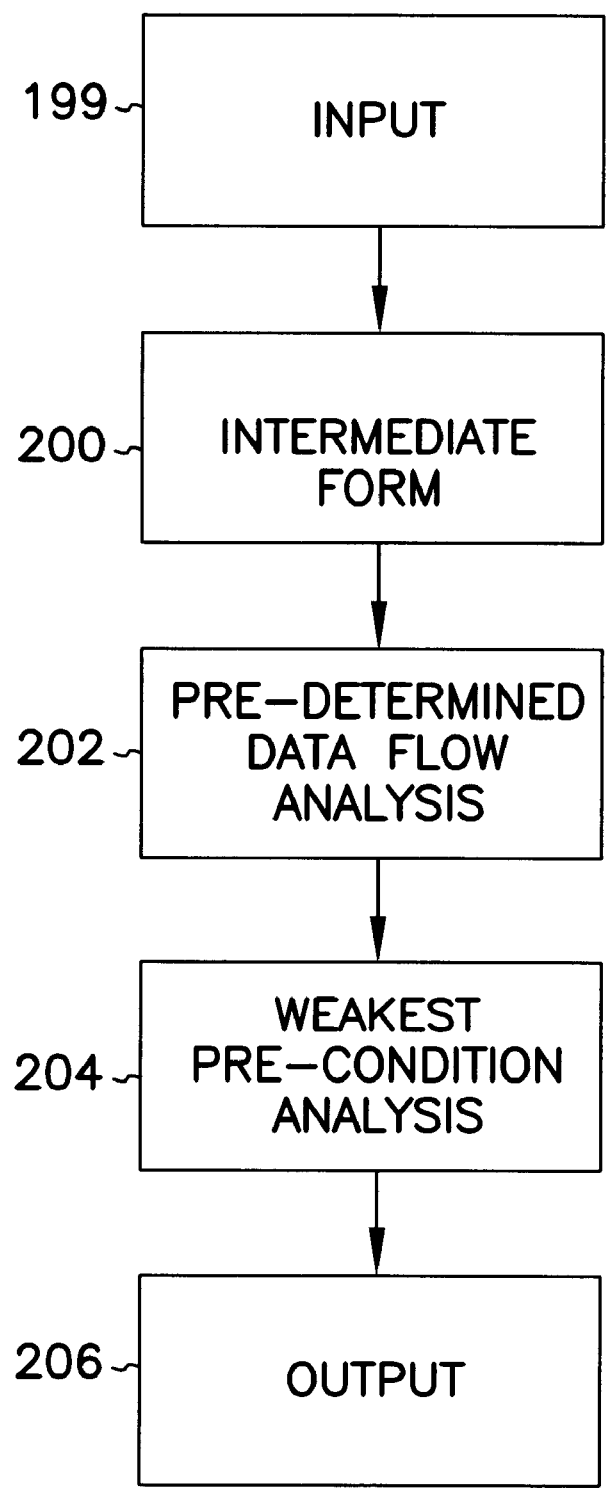
FIG. 2 shows a block diagram of a method according to an embodiment of the invention; and, FIG. 3 shows a block diagram of a system according to one embodiment of the invention.

Referring now to FIG. 2, in 199, a source code of a computer program is received as input (that is, data representing the source code). The source code is a textual description of a computer program—human-readable program statements written in a high-level or assembly language that are not directly readable by a computer. The source code may be written in any type of computer language, such as C, C++, Java, Visual Basic, etc. The source code may be stored on a hard disk drive, or another storage device, such that it is received as input by reading the code from the storage device, or it may be directly entered by a user on an input device of the computer such as a keyboard, or it may be received over a communication device, such as a modem or network adapter card, from another computer. The invention is not so limited. It is noted that the other steps/acts of the method, as described below, do not necessarily require code; the invention itself is only limited as by the appended claims.

In 200, an intermediate form of the computer program is generated from the source code representation of the computer program input in 199. It is noted, however, that 200 is not required in all embodiments of the invention. Such intermediate forms of computer programs include byte code representations (in the case of a computer program where the source code is written in Java), flow graph representations, and tree-based representations, as known to those of ordinary skill within the art.

In 202, a set of candidates of the computer program that are potentially defective is identified, by conducting a predetermined data flow analysis. The predetermined data flow analysis is in one embodiment performed based on the intermediate form of the computer program generated in 200, although the invention is not necessarily so limited. Generally, the set of candidates identified is for a predetermined type of defect. For example, a computer program may wish to seek all parts of the computer program that may contribute to performance bottlenecks when running the computer program. The term candidate refers to a piece or section of the computer program that the predetermined data flow analysis has identified as potentially defective, as the latter term is defined by the computer programmer (e.g., a piece of section of the program is "defective" if it contributes to a performance bottleneck).

The predetermined data flow analysis in 202, in one embodiment, generally cannot with certainty determine whether a given candidate is actually defective; rather, it can only determine whether a given candidate is potentially defective. In other words, the predetermined data flow analysis "weeds out" those pieces, parts and sections of the computer program that are with certainty not defective, and instead identifies only those candidates of the program that may be defective. Desirably, the predetermined data flow analysis is a relatively quick analysis, as compared to, for example, weakest precondition analysis. It provides an initial screening of the computer program to determine candidates that are potentially defective, such that a subsequent analysis that may take longer to perform can be conducted against only those candidates, and not the entire program, as will be described in conjunction with 204.

The predetermined data flow analysis in 202 is not limited by the invention. In one embodiment, the analysis conducted in 202 is static single assignment analysis, whereas in another embodiment, the analysis is partial redundancy analysis, and both of these analyses are known in the art. However, the invention is not so limited. Static Single Assignment analysis is a program representation and analysis technique that ties all definitions of program variables with the locations of their use, using factoring (known as Phi-functions) to drastically reduce the amount of memory overhead required. Partial Redundancy Analysis is a technique whereby certain Boolean equations regarding the "availability" and "partial availability" of computed program values are tracked for every program statement.

Next, in 204, each of the set of candidates identified in 202 is examined via a weakest precondition analysis, to determine whether each candidate is actually defective. Weakest precondition analysis has been described in the background section, and is known in the art. Thus, in 204, the set of candidates identified in 202 as potentially defective is subjected to a stronger, more accurate analysis to narrow the set of candidates to those that are actually defective. Because the weakest precondition analysis is relatively slower to conduct, it is thus only subjected to candidates that the weaker, faster data flow analysis in 202 has flagged as potentially defective. Candidates that are for certain not defective, as indicated by the analysis in 202, arc not subjected to weakest precondition analysis in 204, thus saving time and memory, and providing embodiments of the invention with advantages over the prior art.

Finally, in 206, the candidates determined to actually be defective in 204 are output (that is, the data representing such candidates). In one embodiment, these candidates are displayed on a display device—for example, in the context of an editor program for developers to write source code of the computer program, the corresponding part of the source code to a given defective candidate of the program is highlighted for the developer. In another embodiment, the candidates are printed on a printer, for inspection and study by the developer. The invention is not so limited, however.

System

In this section of the detailed description, a system according to an embodiment of the invention is described. The system can in one embodiment be implemented on a computer as is described in the previous section. Further, description of the system of one embodiment is made in reference to FIG. 3.

Figure 3:
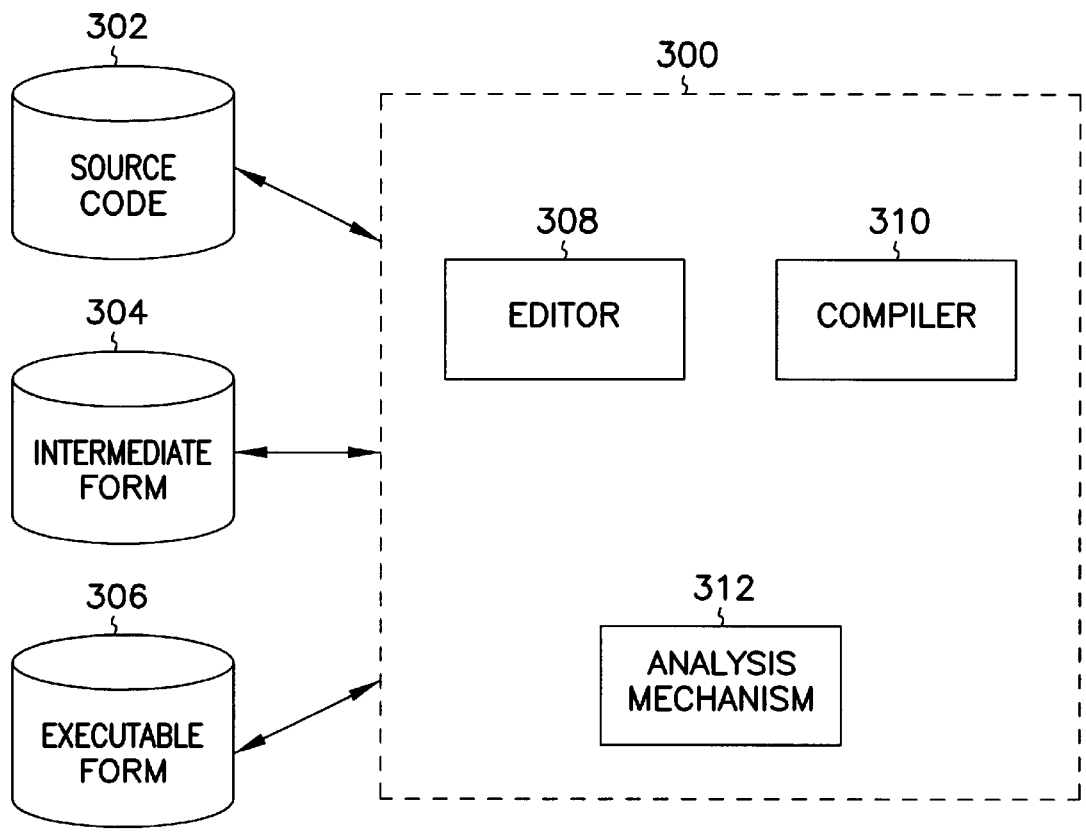

Referring now to FIG. 3, a system according to one embodiment of the invention is shown. The system includes a set of computer programs 300, and three types of code of a computer program: the source code 302, the intermediate form 304, and the executable code 306. Each of these types of code may be stored as data on the same or different computer-readable media of a computer, such as a bard disk drive, random-access memory (RAM), etc. The programs 300 include an editor program 308, a compiler program 310, and an analysis mechanism 312. Each of these programs is listed as separate for illustrative purposes only; in actuality, they may be separate from one another, or part of the same computer program. The system of FIG. 3 may in one embodiment be a computer, such as the computer described in conjunction with FIG. 1, such that the computer includes a processor or processors, as known within the art. In another embodiment, the system of FIG. 3 may be such that each of the set of programs 300 is implemented in hardware, as opposed to software, as is desirably the case.

The editor 308 is that program in which the source code 302 representation of a computer program is able to be created and modified, for example, by a programmer. The compiler 310 compiles the source code 302 representation of the computer program to the executable form 306 thereof; in one specific embodiment, it also generates an intermediate form 304 of the program, as has been described in the previous section of the detailed description. Generally, the executable form 306 refers to machine code that can be directly executed by the system=s processor, but also can refer to assembly language source code or a varation of machine code, as those of ordinary skill within the art can appreciate.

The analysis mechanism 312 identifies a set of candidates of the computer program that are potentially defective, via a predetermined data flow analysis, and then examines each of these candidates via a weakest precondition analysis, to determine whether each candidate actually is defective—as has been described in the previous section of the detailed description. In the embodiment where the compiler 310 generates an intermediate form 304 of the program, the analysis mechanism 312 identifies the set of candidates of the computer program that are potentially defective based on the intermediate form 304 thereof Furthermore, in one embodiment, the editor 308 indicates within the source code 302 representation of the computer program each candidate determined to actually be defective by the analysis mechanism 312—for example, by highlighting the section of source code corresponding to each defective candidate.

Conclusion

Improved weakest condition analysis has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method for analyzing a computer program comprising:
   identifying a set of candidates of the computer program that are potentially defective via a predetermined data flow analysis; and,
   examining each of the set of candidates via a weakest precondition analysis to determine whether the candidate actually is defective.

2. The method of claim 1, further initially comprising generating an intermediate form of the computer program from a source code representation of the computer program such that identification of the set of candidates of the computer program is conducted based on the intermediate form of the computer program.

3. The method of claim 2, wherein the intermediate form comprises one of: a byte code representation, a flow graph representation, and a tree-based representation.

4. The method of claim 1, wherein the set of candidates identified is for a predetermined type of defect.

5. The method of claim 1, wherein the predetermined data flow analysis comprises one of: static single assignment analysis and partial redundancy analysis.

6. The method of claim 1, further comprising:
   initially receiving data representing a computer program; and,
   outputting data representing each candidate determined to actually be defective.

7. The method of claim 6, wherein outputting data comprises one of: printing the data on a printer and outputting the data on a display device.

8. A computerized system comprising:
   an editor in which a source code representation of a computer program is able to be created and modified;
   a compiler program to compile the computer program from the source code representation thereof to an executable form thereof; and,
   an analysis mechanism to identify a set of candidates of the computer program that are potentially defective via a predetermined data flow analysis, and examine each of the set of candidates via a weakest precondition analysis to determine whether the candidate actually is defective.

9. The system of claim 8, wherein the compiler program is further to generate an intermediate form of the computer program from the source code representation thereof, and the analysis mechanism is to identify the set of candidates of the computer program based on the intermediate form thereof.

10. The system of claim 8, wherein the predetermined data flow analysis comprises one of: static single assignment analysis and partial redundancy analysis.

11. The system of claim 8, wherein the editor is to indicate within the source code representation of the computer program each candidate determined to actually be defective by the analysis mechanism.

12. A computer comprising:
   a processor;
   a computer-readable medium;
   data stored on the medium and representing a source code representation of a computer program;
   data stored on the medium and representing a executable form of the computer program;
   an editor program executed by the processor from the medium in which the source code representation of the computer program is able to be created and modified;
   a compiler program executed by the processor from the medium to compile the computer program from the source code representation thereof to the executable form thereof; and,
   an analysis program executed by the processor from the medium to identify a set of candidates of the computer program that are potentially defective via a predetermined data flow analysis, and examine each of the set of candidates via a weakest precondition analysis to determine whether the candidate actually is defective.

13. The computer of claim 12, wherein the compiler program is further to generate an intermediate form of the computer program from the source code representation thereof, and the analysis mechanism is to identify the set of candidates of the computer program based on the intermediate form thereof.

14. The computer of claim 12, wherein the predetermined data flow analysis comprises one of: static single assignment analysis and partial redundancy analysis.

15. The computer of claim 12, wherein the editor is to indicate within the source code representation of the computer program each candidate determined to actually be defective by the analysis mechanism.

16. A computer-readable medium having a computer program stored thereon to cause a computer to perform a method comprising:
   identifying a set of candidates of the computer program that are potentially defective via a predetermined data flow analysis; and,
   examining each of the set of candidates via a weakest precondition analysis to determine whether the candidate actually is defective.

17. The medium of claim 16, wherein the method further initially comprising generating an intermediate form of the computer program from a source code representation of the computer program such that identification of the set of candidates of the computer program is conducted based on the intermediate form of the computer program.

18. The medium of claim 16, wherein the set of candidates identified is for a predetermined type of defect.

19. The medium of claim 16, wherein the predetermined data flow analysis comprises one of: static single assignment analysis and partial redundancy analysis.

20. The medium of claim 16, further comprising:
   initially receiving data representing a computer program; and,
   outputting data representing each candidate determined to actually be defective.

* * * * *